(12) United States Patent
Inoko

(10) Patent No.: US 7,614,751 B2
(45) Date of Patent: Nov. 10, 2009

(54) ILLUMINATION OPTICAL SYSTEM AND IMAGE DISPLAY APPARATUS INCLUDING THE SAME

(75) Inventor: Kazuhiro Inoko, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/004,915

(22) Filed: Dec. 7, 2004

(65) Prior Publication Data

US 2005/0128921 A1    Jun. 16, 2005

(30) Foreign Application Priority Data

Dec. 10, 2003    (JP)    ............... 2003-411784

(51) Int. Cl.
G03B 21/14    (2006.01)
G03B 21/20    (2006.01)

(52) U.S. Cl. .................................. 353/38

(58) Field of Classification Search ............ 353/102, 353/97, 100, 32, 33, 38; 348/745, 756; 349/5, 349/8, 61, 62
See application file for complete search history.

(56) References Cited

U.S. PATENT DOCUMENTS 5,997,143 A * 12/1999 Derra et al. ............... 353/38
6,497,488 B1 * 12/2002 Yamauchi et al. ......... 353/38
6,552,760 B1    4/2003 Gotoh et al. .............. 349/56
6,637,892 B1 * 10/2003 Okuyama et al. .......... 353/38
2002/0036903 A1 *  3/2002 Okuyama et al. ......... 362/257
2002/0140905 A1   10/2002 Ouchi et al. ............. 353/31
2002/0196629 A1   12/2002 Terashi .................. 362/331

FOREIGN PATENT DOCUMENTS

| EP | 1 031 870 | 8/2000 |
| JP | 06-075200 | 3/1994 |
| JP | 11-038203 | 2/1999 |
| JP | 2001-201794 | 7/2001 |
| JP | 2001-221988 | 8/2001 |

* cited by examiner

*Primary Examiner*—Hung Henry Nguyen
(74) *Attorney, Agent, or Firm*—Fitzpatrick, Cella, Harper & Scinto

(57) ABSTRACT

A lens array has a plurality of first minute optical elements which are one-dimensionally arranged in a predetermined arrange direction. Two of the plurality of first minute optical elements have refractive powers different from each other in a direction perpendicular to the predetermined arrange direction, and the plurality of first minute optical elements are arranged only in the predetermined arrange direction.

10 Claims, 11 Drawing Sheets

FIG. 8
(CONVENTIONAL)
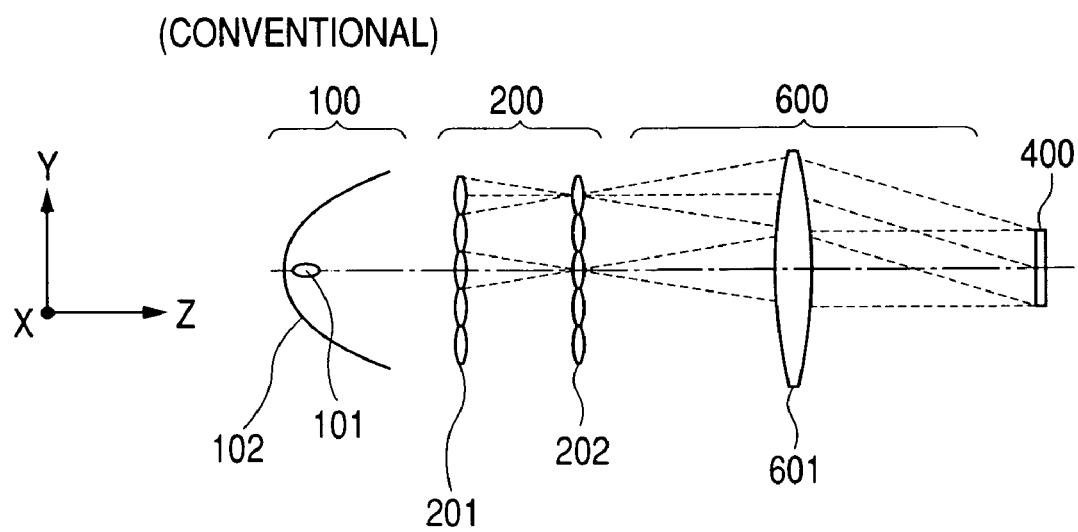

(WELL-KNOWN)

ILLUMINATION OPTICAL SYSTEM AND IMAGE DISPLAY APPARATUS INCLUDING THE SAME

BACKGROUND OF THE INVENTION

1. Field of the Invention

The present invention relates to an illumination optical system and an image display apparatus including the illumination optical system and is suitable for use in, for example, a projector which has a structure in which a beam emitted from a light source system is allowed to enter a light bulb (image display element) using a liquid crystal panel or the like and modulated thereby, and then the modulated beam is enlargedly projected onto a projection surface (screen surface) through a projection optical system (projection lens).

2. Related Background Art

Up to now, various projectors each having a configuration in which a beam modulated according to image information using a liquid crystal light bulb or the like is enlargedly projected onto a screen or the like through a projection lens have been proposed (for example, US 2002/140905 A, Japanese Patent Application Laid-Open No. 2001-201794, and Japanese Patent Application Laid-Open No. 2001-221988). For such projectors, it is important that the entire image projected onto the screen have a substantially uniform brightness.

FIG. 8 is an explanatory view showing an illumination optical system used for a conventional projector. In FIG. 8, the illumination optical system includes a light source system 100, an optical integrator 200, and an optical system 600. In the light source system 100, beams emitted from a light source 101 in all directions are condensed by a reflector 102 or the like and travel forward. The optical integrator 200 has a first integrator 201 and a second integrator 202 in each of which minute lenses are two-dimensionally arranged to form a plurality of light source images based on the beams from the light source system 100. In the optical system 600, each of the plurality of light source images from the optical integrator 200 is condensed to illuminate a light bulb 400 serving as a surface to be illuminated with the superimposed light source images.

In order to simplify the description, FIG. 8 shows only principal constituent elements for explaining a function of the illumination optical system.

In the illumination optical system shown in FIG. 8, the light source system 100 has the light source 101 and the reflector 102. The optical integrator 200 has the first integrator 201 and the second integrator 202 in each of which the minute lenses are two-dimensionally arranged. The optical system 600 has a condenser lens 601.

The beams radially emitted from the light source 101 are reflected on the reflector 102 and exited therefrom as substantially parallel beams. The first integrator 201 forms the plurality of light source images (secondary light source images) in the vicinity of the second integrator 202 based on the beams from the light source system 100. Respective lens cells (minute optical elements) of the first integrator 201 are conjugate with the light bulb 400 serving as the surface to be illuminated with respect to the second integrator 202 and the condenser lens 601. Therefore, the superimposed light source images of the respective lens cells are formed on the surface to be illuminated 400 by the condenser lens 601.

A recent projector has three light bulbs for red, green, and blue in most cases. Therefore, it is necessary to illuminate the light bulbs for respective colors with corresponding beams produced by color splitting of a beam from a single light source using a color splitting optical system such as a dichroic mirror. In this case, in the structure using the integrator having the minute lenses (lenses having refractive power in both a longitudinal direction and a lateral direction, that is, normal lenses) which are two-dimensionally arranged as shown in FIG. 8, color nonuniformity occurs on an image projected onto the screen. According to Japanese Patent Application Laid-Open No. 06-075200, as shown in FIG. 18, a first lens array 501 is composed of a cylindrical lens unit 501-*a* and a second lens array 502 is composed of a cylindrical lens unit 502-*a*. Beams exited from the second lens array 502 are superimposed on a liquid crystal panel 507 by a field lens 503 to illuminate the liquid crystal panel 507, thereby reducing the occurrence of color nonuniformity.

However, according to the configuration described in Japanese Patent Application Laid-Open No. 06-075200, uniformity in a light amount cannot be achieved with respect to a direction in which neither the cylindrical lens unit 501-*a* nor the cylindrical lens unit 502-*a* has a refractive power. Therefore, nonuniformity in illuminance occurs on the liquid crystal panel 507.

SUMMARY OF THE INVENTION

A lens array of the present invention includes a plurality of first minute optical elements which are one-dimensionally arranged in a predetermined arrange direction, in which two of the plurality of first minute optical elements have refractive powers different from each other in a direction perpendicular to the predetermined arrange direction.

Further, an illumination optical system according to an aspect of the present invention includes the above-mentioned lens array.

Still further, according to another aspect of the invention, an illumination optical system for illuminating a surface to be illuminated with a beam from a light source includes first beam splitting means for splitting the beam from the light source into a plurality of beams, the first beam splitting means including a plurality of first minute optical elements which are one-dimensionally arranged in a predetermined arrange direction; and illuminance nonuniformity reducing means for reducing nonuniformity in illuminance on the surface to be illuminated.

Yet further, according to another aspect of the invention, an illumination optical system for illuminating a surface to be illuminated with a beam from a light source includes first beam splitting means for splitting the beam from the light source into a plurality of beams, the first beam splitting means including a plurality of first minute optical elements which are one-dimensionally arranged in a predetermined arrange direction, in which two of the plurality of first minute optical elements have refractive powers different from each other in a direction perpendicular to the predetermined arrange direction.

Furthermore, according to another aspect of the invention, an illumination optical system for illuminating a surface to be illuminated with a beam from a light source includes first beam splitting means for splitting the beam from the light source into a plurality of beams, the first beam splitting means including a plurality of first minute optical elements which are one-dimensionally arranged in a predetermined arrange direction; and second beam splitting means including a plurality of second minute optical elements which are one-dimensionally arranged in the predetermined arrange direction so as to correspond to the plurality of beams, in which two of the plurality of first minute optical elements have refractive powers different from each other in a direction perpendicular to the predetermined arrange direction and/or two of the plurality of second minute optical elements have refractive powers different from each other in the direction perpendicular to the predetermined arrange direction.

Moreover, according to another aspect of the invention, an illumination optical system for illuminating a surface to be illuminated with a beam from a light source includes first beam splitting means for splitting the beam from the light source into a plurality of beams, the first beam splitting means including a plurality of first minute optical elements which are one-dimensionally arranged in a predetermined arrange direction, in which at least one of the first minute optical elements satisfies $1/fx1 \neq 0$, with assuming the predetermined arrange direction be a Y-direction, an optical axis direction of the illumination optical system be a Z-direction, a direction perpendicular to the Y-direction and the Z-direction be an X-direction, and fx1 be a paraxial focal length of each of the plurality of first minute optical elements within an XZ-plane including the X-direction and the Z-direction.

Further, according to another aspect of the invention, an illumination optical system for illuminating a surface to be illuminated with a beam from a light source includes first beam splitting means for splitting the beam from the light source into a plurality of beams, the first beam splitting means including a plurality of first minute optical elements which are one-dimensionally arranged in a predetermined arrange direction; and an optical deflection element which is disposed between the first beam splitting means and the surface to be illuminated and includes at least one prism, in which, assuming the predetermined arrange direction be a Y-direction, an optical axis direction of the illumination optical system be a Z-direction, and a direction perpendicular to the Y-direction and the Z-direction be an X-direction, the optical deflection element deflects the beam only in the X-direction.

Still further, according to another aspect of the invention, an image display apparatus includes at least one image display element, the illumination optical system for illuminating the at least one image display element with the beam from the light source, and a projection optical system for projecting the beam from the at least one image display element onto a surface to be projected.

BRIEF DESCRIPTION OF THE DRAWINGS

FIG. 8 is a structural view showing a conventional illumination optical system;

DETAILED DESCRIPTION OF THE PREFERRED EMBODIMENTS

Figure 1:
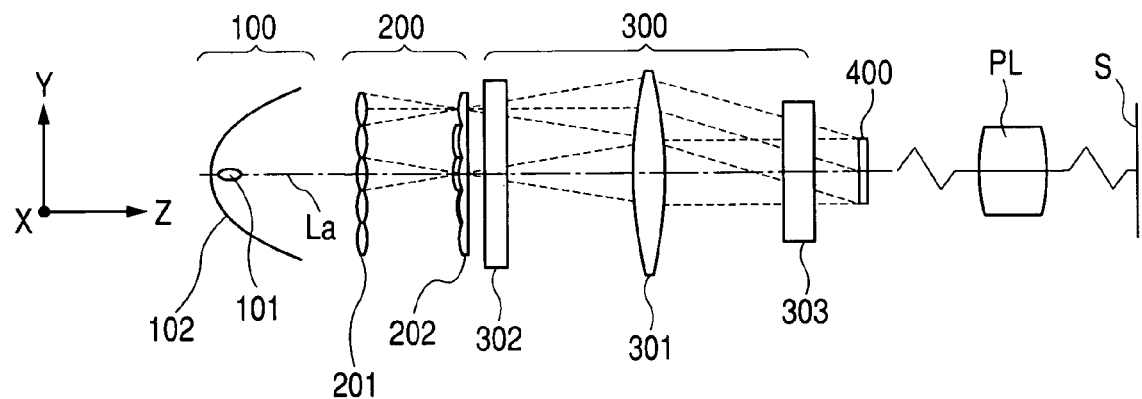
FIG. 1 is a principal part sectional view showing Embodiment 1 of the present invention.

A summary of embodiments of the present invention can be described as follows.

A lens array according to an embodiment is a lens array having a plurality of first minute optical elements that are one-dimensionally arranged in a predetermined arrange direction. Two of the plurality of first minute optical elements have refractive powers different from each other in a direction perpendicular to the predetermined arrange direction. The direction perpendicular to the predetermined arrange direction is an X-direction in FIGS. 1, 2, and 3 and may translate into an XZ-plane, that is, a plane perpendicular to the predetermined arrange direction. In other words, this indicates that refractive power of a part (at least one) of the plurality of first minute optical elements in the direction perpendicular to the predetermined arrange direction is different from refractive power of another part of the first minute optical elements in the direction perpendicular to the predetermined arrange direction.

The plurality of first minute optical elements are arranged only in the predetermined arrange direction. Refractive powers of two of the plurality of first minute optical elements in the predetermined arrange direction are substantially equal to each other. Refractive powers of all the plurality of first minute optical elements in the predetermined arrange direction are substantially equal to one another. That is, a difference between a maximum focal length and a minimum focal length falls within 5% of an average focal length of the first minute optical elements in an arrange direction or within 3% of the maximum focal length. A refractive power of at least one of the plurality of first minute optical elements in the direction perpendicular to the predetermined arrange direction is substantially zero. This may say that at least one of the plurality of first minute optical elements has no refractive power or an infinite focal length. The direction perpendicular to the predetermined arrange direction is a direction substantially perpendicular to both the predetermined arrange direction and a principal ray of a beam passing through the lens array. In other words, each of the first minute optical elements has a long direction and a short direction, and thus the direction perpendicular to the predetermined arrange direction is a direction substantially perpendicular to both the predetermined arrange direction and the long direction.

An illumination optical system according to the embodiment includes the above-mentioned lens array and guides a beam from a light source to the surface to be illuminated through the lens array.

An illumination optical system according to another embodiment relates to an illumination optical system for illuminating a surface to be illuminated with beam from a light source, which includes: first beam splitting means for splitting the beam from the light source into a plurality of beams, the first beam splitting means including a plurality of first minute optical elements which are one-dimensionally arranged in a predetermined arrange direction; and illuminance nonuniformity reducing means for reducing nonuniformity in illuminance on the surface to be illuminated.

An illumination optical system according to another embodiment relates to an illumination optical system for illuminating a surface to be illuminated with beam from a light source, which includes: first beam splitting means for splitting the beam from the light source into a plurality of beams, the first beam splitting means including a plurality of first minute optical elements which are one-dimensionally arranged in a predetermined arrange direction, in which two of the plurality of first minute optical elements have refractive powers different from each other in a direction perpendicular to the predetermined arrange direction.

The plurality of first minute optical elements are arranged only in the predetermined arrange direction. Refractive powers of at least two of the plurality of first minute optical elements in the predetermined arrange direction are substantially equal to each other. The first beam splitting means is composed of the plurality of first minute optical elements. A refractive power of at least one of the plurality of first minute optical elements in the direction perpendicular to the predetermined arrange direction is substantially zero.

The illumination optical system further includes a polarizing conversion element, which has a plurality of light shielding regions arranged along the predetermined arrange direction and converts light exited from the first beam splitting means into predetermined linear polarized beam. Further, the illumination optical system further includes a polarizing conversion element, which has a plurality of polarizing splitting planes arranged along the predetermined arrange direction and converts the beam exited from the first beam splitting means into predetermined linear polarized beam.

An illumination optical system according to another embodiment relates to an illumination optical system which includes: first beam splitting means for splitting a beam from a light source into a plurality of beams; the first beam splitting means including a plurality of first minute optical elements which are one-dimensionally arranged in a predetermined arrange direction, and second beam splitting means including a plurality of second minute optical elements which are one-dimensionally arranged in the predetermined arrange direction so as to correspond to the plurality of beams, in which two of the plurality of first minute optical elements have refractive powers different from each other in a direction perpendicular to the predetermined arrange direction and/or two of the plurality of second minute optical elements have refractive powers different from each other in the direction perpendicular to the predetermined arrange direction.

Refractive powers of the plurality of first minute optical elements in the predetermined arrange direction are substantially equal to one another. Refractive powers of the plurality of second minute optical elements in the predetermined arrange direction are substantially equal to one another. The illumination optical system further includes a polarizing conversion element which has a plurality of light shielding regions arranged along the predetermined arrange direction and converts a beam exited from the second beam splitting means into predetermined linear polarized light.

In the illumination optical system, the direction perpendicular to the predetermined arrange direction is a direction substantially perpendicular to both the predetermined arrange direction and an optical axis of the illumination optical system. In addition, the direction perpendicular to the predetermined arrange direction is a direction substantially perpendicular to both the predetermined arrange direction and a principal ray of a beam passing through the first beam splitting means. Each of the first minute optical elements has a long direction and a short direction, so that the direction perpendicular to the predetermined arrange direction may translate into a direction substantially perpendicular to both the predetermined arrange direction and the long direction.

An illumination optical system according to another embodiment relates to an illumination optical system for illuminating a surface to be illuminated with a beam from a light source, which includes first beam splitting means for splitting the beam from the light source into a plurality of beams, the first beam splitting means including a plurality of first minute optical elements which are one-dimensionally arranged in a predetermined arrange direction; and illuminance nonuniformity reducing means for reducing nonuniformity in illuminance on the surface to be illuminated, which is disposed on at least one of optical paths corresponding to the plurality of split beams from the first beam splitting means.

Assuming that a Y-direction be the predetermined arrange direction, a Z-direction be an optical axis direction of the illumination optical system, an X-direction be a direction perpendicular to the Y-direction and the Z-direction, and fx1 be a paraxial focal length of each of the plurality of first minute optical elements within an XZ-plane including the X-direction and the Z-direction, at least one of the first minute optical elements satisfies $1/fx1 \neq 0$.

Assuming that the Z-direction be the predetermined arrange direction, the Y-direction be an optical axis direction of the illumination optical system, the X-direction be a direction perpendicular to the Y-direction and the Z-direction, and fx1 be a paraxial focal length of each of the plurality of first minute optical elements within an XZ-plane including the X-direction and the Z-direction, at least one of the first minute optical elements satisfies $1/fx1 \neq 0$.

Assuming that the Y-direction be the predetermined arrange direction, the Z-direction be the optical axis direction of the illumination optical system, the X-direction the direction perpendicular to the Y-direction and the Z-direction, and fy1 be a paraxial focal length of each of the plurality of first minute optical elements within the YZ-plane including the Y-direction and the Z-direction, the paraxial focal lengths fy1 of the plurality of first minute optical elements are substantially equal to one another.

The illumination optical system further includes second beam splitting means having a plurality of second minute optical elements which are one-dimensionally arranged in the predetermined arrange direction and correspond to the plurality of first minute optical elements. Refractive powers of the plurality of first minute optical elements in the predetermined arrange direction are substantially equal to one another. Refractive powers of the plurality of second minute optical elements in the predetermined arrange direction are substantially equal to one another. Assuming that the Y-direction be the predetermined arrange direction, the Z-direction be the optical axis direction of the illumination optical system, the X-direction be the direction perpendicular to the Y-direction and the Z-direction, and fx2 be a paraxial focal length of each of the plurality of second minute optical elements within the XZ-plane including the X-direction and the Z-direction, at least one of the second minute optical elements satisfies $1/fx2 \neq 0$.

Assuming that the Y-direction be the predetermined arrange direction, the Z-direction the optical axis direction of the illumination optical system, the X-direction be the direction perpendicular to the Y-direction and the Z-direction, and fx2 be a paraxial focal length of each of the plurality of second minute optical elements within the XZ-plane including the X-direction and the Z-direction, at least one of the second minute optical elements satisfies $1/fx2=0$.

Assuming that the Y-direction be the predetermined arrange direction, the Z-direction be the optical axis direction of the illumination optical system, the X-direction the direction perpendicular to the Y-direction and the Z-direction, and fy2 be a paraxial focal length of each of the plurality of second minute optical elements within the YZ-plane including the Y-direction and the Z-direction, the paraxial focal lengths fy2 of the plurality of second minute optical elements are substantially equal to one another.

In an illumination optical system according to another embodiment, assuming that the Y-direction be the predetermined arrange direction, the Z-direction be the optical axis direction of the illumination optical system, the X-direction be the direction perpendicular to the Y-direction and the Z-direction. The surface to be illuminated is irradiated with the plurality of superimposed beams from the first beam splitting means within the YZ-plane including the Y-direction and the Z-direction. The illuminance nonuniformity reducing means reduces the nonuniformity in illuminance on the surface to be illuminated within the XZ-plane including the X-direction and the Z-direction or a plane parallel to the XZ-plane.

In an illumination optical system according to another embodiment, assuming that the Y-direction be the predetermined arrange direction, the Z-direction be the optical axis direction of the illumination optical system, the X-direction be the direction perpendicular to the Y-direction and the Z-direction, fx be a paraxial focal length of each of the optical members within the XZ-plane including the X-direction and the Z-direction, and $fxsum=\Sigma(1/fx)$ be the sum of the reciprocals of paraxial focal lengths fx of all optical members disposed on respective optical paths along which the plurality of split beams from the first beam splitting means reach the surface to be illuminated, a value of fxsum on at least one optical path is different from a value of fxsum on another optical path.

Here, with assuming that the Y-direction be the predetermined arrange direction, the Z-direction be the optical axis direction of the illumination optical system, the X-direction be the direction perpendicular to the Y-direction and the Z-direction, the illumination optical system further includes an optical system which is an a focal system for compressing beams within the XZ-plane including the X-direction and the Z-direction.

Assuming that the Y-direction be the predetermined arrange direction, the Z-direction be the optical axis direction of the illumination optical system, the X-direction be the direction perpendicular to the Y-direction and the Z-direction, the illumination optical system further includes a first optical element, which is disposed on an optical path corresponding to a part of the plurality of beams and has a refractive power within the XZ-plane including the X-direction and the Z-direction.

Assuming that the Y-direction be the predetermined arrange direction, the Z-direction be the optical axis direction of the illumination optical system, the X-direction be the direction perpendicular to the Y-direction and the Z-direction, the illumination optical system further includes a first optical element and a second optical element. The first optical element is disposed on an optical path corresponding to a part of the plurality of beams and has a refractive power within the XZ-plane including the X-direction and the Z-direction. The second optical element is disposed on an optical path corresponding to a beam different from the part of the plurality of beams and has a refractive power different from the refractive power of the first optical element within the XZ-plane.

Assuming that the Y-direction be the predetermined arrange direction, the Z-direction be the optical axis direction of the illumination optical system, the X-direction be the direction perpendicular to the Y-direction and the Z-direction, the illumination optical system further includes an optical deflection element which is disposed between the first beam splitting means and the surface to be illuminated and deflects light only in the X-direction. The optical deflection element includes at least one prism. The optical deflection element is a prism, which is flat on a light source side and has a convex shape on a surface-to-be-illuminated side. The optical deflection element may be a prism, which is flat on the light source side and has two convex portions on the surface-to-be-illuminated side. The optical deflection element may be a prism, which has a convex shape on the light source side and a concave shape on the surface-to-be-illuminated side. The optical deflection element may be composed of a plurality of prisms. The optical deflection element has no refractive power. The optical deflection element has no focal length. The optical deflection element deflects beams so as to reduce the nonuniformity in illuminance on the surface to be illuminated.

Here, the illumination optical system further includes second beam splitting means including a plurality of second minute optical elements which are one-dimensionally arranged in the predetermined arrange direction and correspond to the plurality of first minute optical elements. The optical deflection element is disposed between the first beam splitting means and the second beam splitting means.

An image display apparatus according to an embodiment includes any one of the above-mentioned illumination optical systems, at least one image display element illuminated with the beam from the light source by the illumination optical system, and a projection optical system for projecting beam from the at least one image display element onto a surface to be projected.

An image display apparatus according to another embodiment includes any one of the above-mentioned illumination optical systems, a plurality of image forming elements illuminated with the beam from the light source by the illumination optical system, and a projection optical system for projecting beam from the plurality of image forming elements onto a surface to be projected. The illumination optical system further includes a color splitting optical system for splitting the beam from the light source into a plurality of color beams corresponding to the plurality of image forming elements. The color splitting optical system has a color splitting surface substantially perpendicular to the predetermined arrange direction.

An image display apparatus according to another embodiment includes any one of the above-mentioned illumination optical systems, a plurality of image forming elements illuminated with the beam from the light source by the illumination optical system, and a projection optical system for projecting beam from the plurality of image forming elements onto a surface to be projected. The illumination optical system further includes a color splitting optical system for splitting the beam from the light source into a plurality of color beams corresponding to the plurality of image forming elements. The color splitting optical system has a color splitting surface substantially parallel to the predetermined arrange direction. The color splitting surface includes a dichroic surface and/or a polarizing separation plane.

Hereinafter, the embodiments will be specifically described in detail with reference to the accompanying drawings.

Embodiment 1

Figure 2:
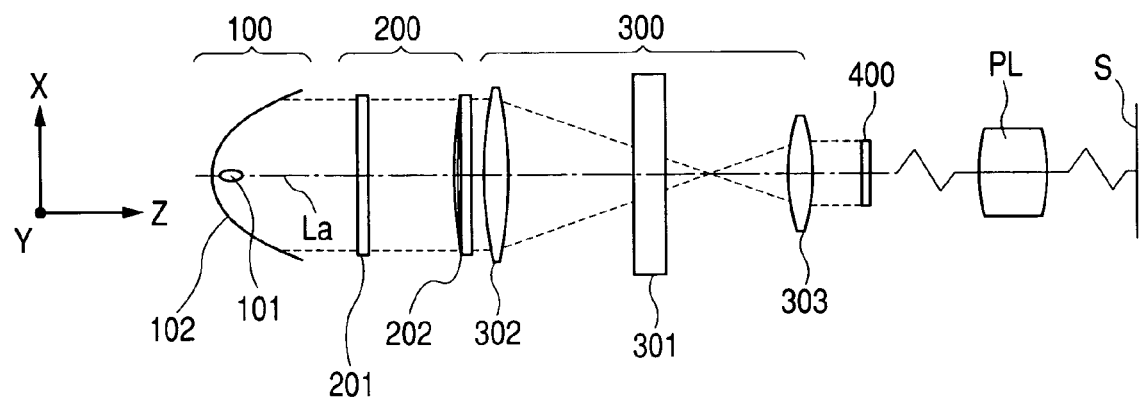
FIG. 2 is a principal part sectional view in a direction perpendicular to a paper surface shown in FIG. 1.
Figure 3:
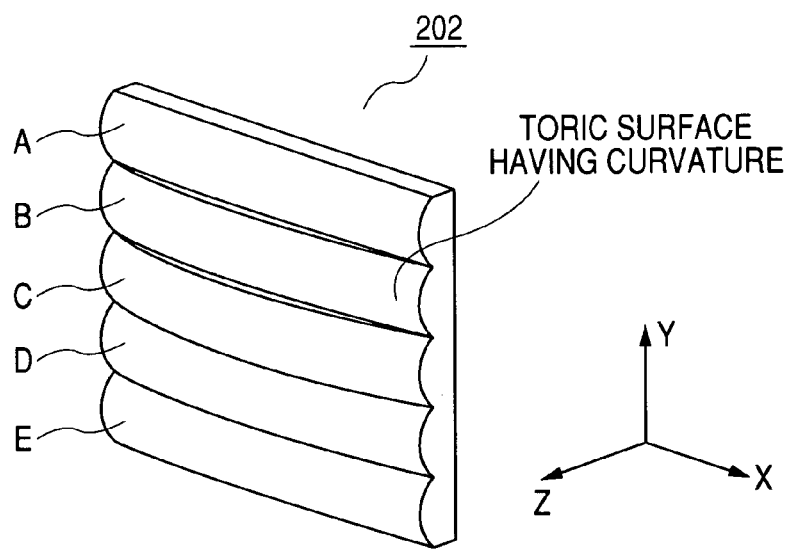
FIG. 3 is a perspective view showing an optical integrator used for an illumination optical system according to Embodiment 1 of the present invention.

FIG. 1 is a principal part sectional view showing an image display apparatus including an illumination optical system according to Embodiment 1 of the present invention. FIG. 2 is a principal part sectional view in a direction perpendicular to a paper surface shown in FIG. 1, including an optical axis La of the illumination optical system. FIG. 3 is a perspective view showing a part of the illumination optical system shown in FIG. 1. With respect to coordinate axes in FIGS. 1 and 2, assume that a Z-axis be an optical axis direction, a Y-axis be a direction in a paper surface orthogonal to the Z-axis (arrange direction of cylindrical lenses), and an X-axis be a direction orthogonal to the Z-axis and perpendicular to the paper surface. Therefore, FIG. 1 shows a YZ-plane and FIG. 2 shows an XZ-plane.

In FIGS. 1 to 3, reference numeral 100 denotes a light source system, 101 denotes a light source, 102 denotes a reflector, 200 denotes an optical integrator, 201 denotes a first integrator, and 202 denotes a second integrator. Reference numeral 300 denotes an optical system, 301 denotes a condenser lens, 302 denotes a first beam compressing lens, 303 denotes a second beam compressing lens, and 400 denotes a surface to be illuminated (light bulb). Reference symbol PL denotes a projection lens and S denotes a screen. A beam from the light source system 100 including the light source 101 and the reflector 102 passes through the optical integrator 200, which includes the first integrator (first beam splitting means) 201 and the second integrator (second beam splitting means) 202 formed in a shape shown in FIG. 3, and the optical system 300, which includes the first beam compressing lens 302, the condenser lens 301, and the second beam compressing lens 303, in order and is guided to the light bulb (light bulb having the surface to be illuminated) 400 of a reflection type or transmission type. Then, a beam related to image information based on the light bulb 400 is projected onto a surface of the screen S by the projection lens PL. Note that hereinafter, each of the first and second integrators is also referred to as an "integrator". A halogen lamp, a metal halide lamp, an ultrahigh pressure mercury lamp, or the like can be applied to the light source 101.

Figure 11:
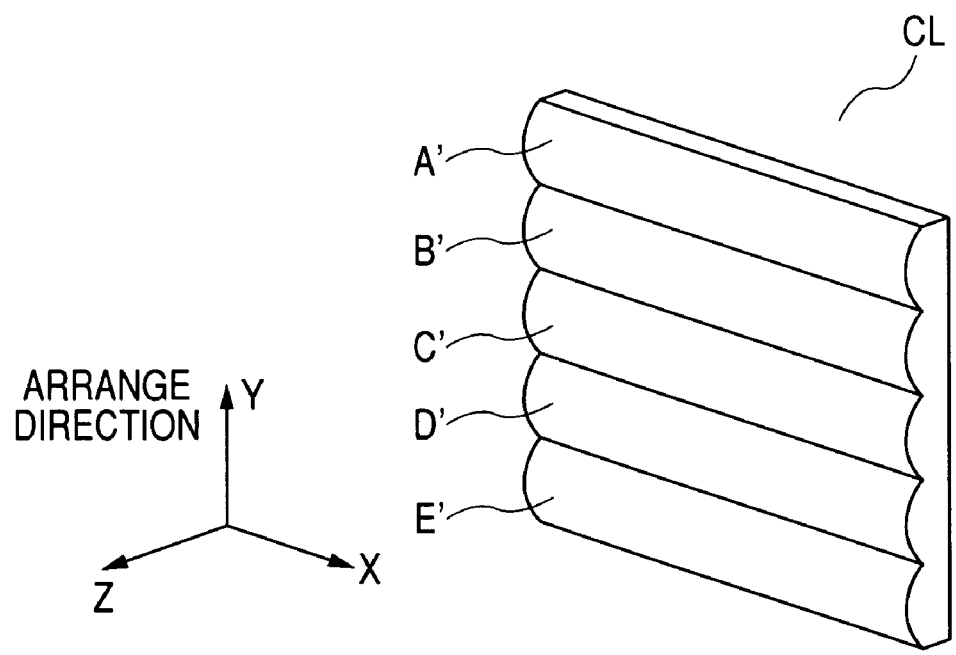
FIG. 11 is a perspective view showing an optical integrator used for the asymmetrical illumination optical system of the comparison example.

As shown in FIG. 11, the first integrator (first beam splitting means) 201 has a structure in which cylindrical lenses A', B', C', D', and E' serving as a plurality of first minute optical elements are arranged in the Y-direction.

As shown in FIG. 3, the second integrator (second beam splitting means) 202 has a structure in which optical members A, B, C, D, and E serving as a plurality of second minute optical elements having refractive power in the X-direction different from that in the Y-direction are arranged in the Y-direction. Each of the optical members A and E is composed of a cylindrical lens having a refractive power only in the Y-direction. Each of the optical members B, C, and D is composed of a toric lens having refractive power in the X-direction different from that in the Y-direction.

Each of the optical members A, B, C, D, and E may be composed of a toric lens. Each of the optical members A, B, D, and E may be composed of a cylindrical lens and only the optical member C may be composed of a toric lens. In this embodiment, the second integrator 202 includes the five optical members. However, the number of optical members is not limited to five.

It is preferable that the refractive powers of the optical members A, B, C, D, and E in the Y-direction (within YZ-plane including the Y-axis and the Z-axis ) be equal to one another. Of course, although a slight difference is allowed, it is desirable that a difference between focal lengths of two lenses fall within 10% of the focal length of one of the two lenses, more preferably, within 3% thereof.

In this embodiment, the second integrator 202 composes illuminance nonuniformity reducing means for reducing nonuniformity in illuminance on the surface to be illuminated 400.

Each of the first beam compressing lens 302 and the second beam compressing lens 303 is composed of a cylindrical lens having a refractive power only within the XZ-plane shown in FIG. 2. A sectional shape (shape in XY-plane) of the beam from the light source system 100 is allowed to coincide with a shape of the surface to be illuminated of the light bulb 400. In this embodiment, the beam is reduced in size only in the X-direction.

The condenser lens 301 is composed of a cylindrical lens having a refractive power only within the YZ-plane shown in FIG. 1. A polarizing conversion element may be disposed between the optical integrator 200 and the optical system 300 to illuminate a liquid crystal panel provided on the surface to be illuminated 400 with a beam having a predetermined polarizing orientation.

Within the YZ-section (YZ-plane) including an arrange direction of each of the lenses of the first and second integrators 201 and 202 shown in FIG. 1, the beam (parallel beam) from the light source system 100 is incident on the first integrator 201 and condensed thereby, and then the condensed beam is incident on the second integrator 202.

Then, a plurality of secondary light source images are formed on an exit surface of the second integrator 202 or the vicinity thereof. The surface to be illuminated (light bulb) 400 is irradiated with superimposed respective beams related to the plurality of secondary light source images by the optical system 300. Therefore, the luminance distribution on the surface to be illuminated 400 becomes substantially uniform within the YZ-section.

In contrast to this, assume that each of the first and second integrators 201 and 202 has a structure in which a plurality of cylindrical lenses are arranged as in a conventional case. In such a case, even when the beam from the light source system 100 passes through the first and second integrators 201 and 202, the plurality of secondary light source images are not formed within the XZ-section (XZ-plane) including a direction orthogonal to an arrange direction of each of the lenses of the first and second integrators 201 and 202 shown in FIG. 2.

This is because each of the first and second integrators 201 and 202 has no refractive power.

As a result, there is no case where the respective beams related to the plurality of secondary light source images are superimposed on the surface to be illuminated. 400 by the optical system 300. Therefore, it is hard to uniform the luminance distribution on the surface to be illuminated 400. According to the present invention, at least one optical member of the optical members A, B, C, D, and E of the second integrator 202 is composed of a toric lens having a curvature in the X-direction. Thus, the luminance distribution on the surface to be illuminated 400 in the XZ-section is uniformed.

In this embodiment, the illuminance nonuniformity reducing means (such as a spherical lens, an aspherical lens, or a prism) for condensing or diverging beam in a direction (X-direction) orthogonal to the arrange direction of the optical members of the first integrator 201 is disposed on at least one optical path of respective optical paths (five optical paths) into which an optical path is divided by the first integrator 201 and which reach the surface to be illuminated 400. Therefore, the nonuniformity in an intensity distribution on the light bulb 400 which occurs in an asymmetrical illumination optical system is reduced to obtain a more uniform distribution.

Next, a shape and optical characteristic of the second integrator 202 according to this embodiment will be described.

A conventional optical integrator is composed of only a plurality of cylindrical lenses. In contrast to this, a part of the optical members of the optical integrator according to this embodiment is formed in a toric shape (composed of a toric lens) having a radius of curvature in a direction (X-direction) orthogonal to the arrange direction (Y-direction). More specifically, as described above, the second integrator 202 includes the five optical members. When the respective optical members A, B, C, D, and E are provided from the top, the three optical members B, C, and D are formed so as to have refractive powers (which are not zero) different from one another in a sectional direction (X-direction) orthogonal to both the arrange direction (Y-direction) of the plurality of optical members composing the second integrator 202 and the optical axis La of the illumination optical system including the second integrator 202. The uniformity in intensity on the light bulb (surface to be illuminated) 400 is achieved by using such a structure.

In particular, in this embodiment, the structure of the second integrator is specified as described above. Thus, the nonuniformity in the intensity distribution on the light bulb 400 which occurs in the conventional asymmetrical illumination optical system is reduced to obtain a more uniform intensity distribution.

Figure 9:
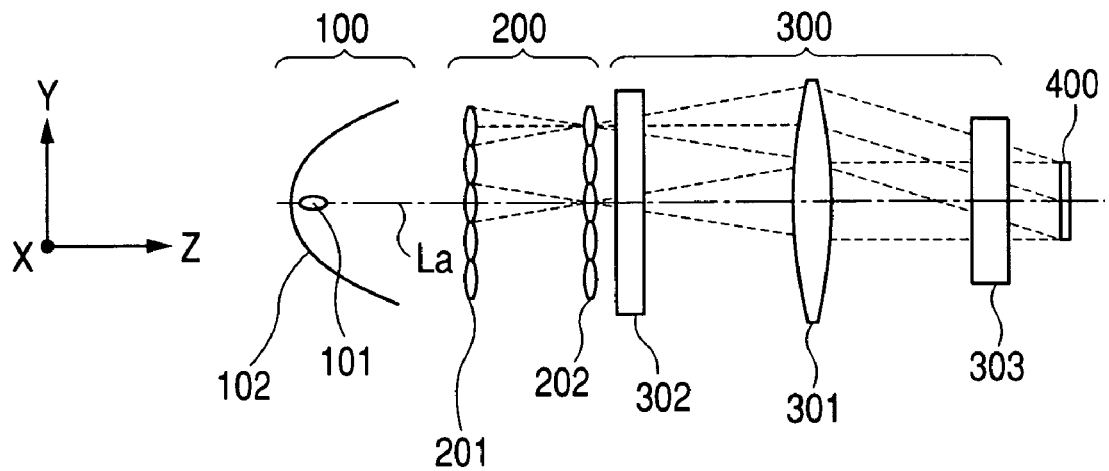
FIG. 9 is a principal part sectional view showing an asymmetrical illumination optical system of a comparison example.
Figure 10:
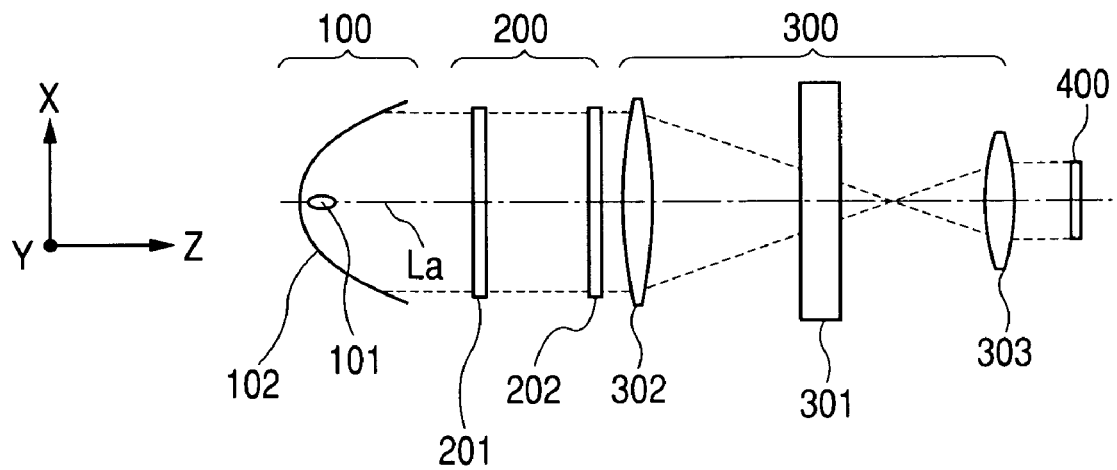
FIG. 10 is a principal part sectional view in a direction perpendicular to a paper surface shown in FIG. 9.

Next, this reason will be described. A comparison example in which an illumination optical system shown in FIGS. 9 and 10 is constructed using the integrator having the cylindrical lenses A' to E' shown in FIG. 11 as each of the first integrator and the second integrator is compared with this embodiment. FIGS. 9 and 10 show two sections orthogonal to each other, of the illumination optical system in the comparison example.

FIG. 9 shows a section (YZ-plane) parallel to the arrange direction (Y-direction) of each of the lenses of the optical integrator 200. The optical system 300 includes the condenser lens 301 having a condensing power only with respect to the Y-direction, the first beam compressing lens 302, and the second beam compressing lens 303. The first beam compressing lens 302 and the second beam compressing lens 303 have no refractive power in the section shown in FIG. 9 and thus can be treated as merely glass blocks. The first integrator 201, the second integrator 202, and the condenser lens 301 each are composed of cylindrical lenses each having a refractive power only in the section shown in FIG. 9.

FIG. 10 shows a section (XZ-plane) orthogonal to the section-shown in FIG. 9. In FIG. 10, the optical integrator 200 and the condenser lens 301 have no refractive power. On the other hand, the first beam compressing lens 302 and the second beam compressing lens 303 are disposed so as to construct a substantially a focal system for exiting parallel light compressed at a predetermined pupil magnification. A substantially parallel beam emitted from the light source system 100 is condensed by the first beam compressing lens 302 and the second beam compressing lens 303. Then, the condensed beam reaches the light bulb 400 as a substantially parallel beam again to illuminate the light bulb 400.

Figure 12:
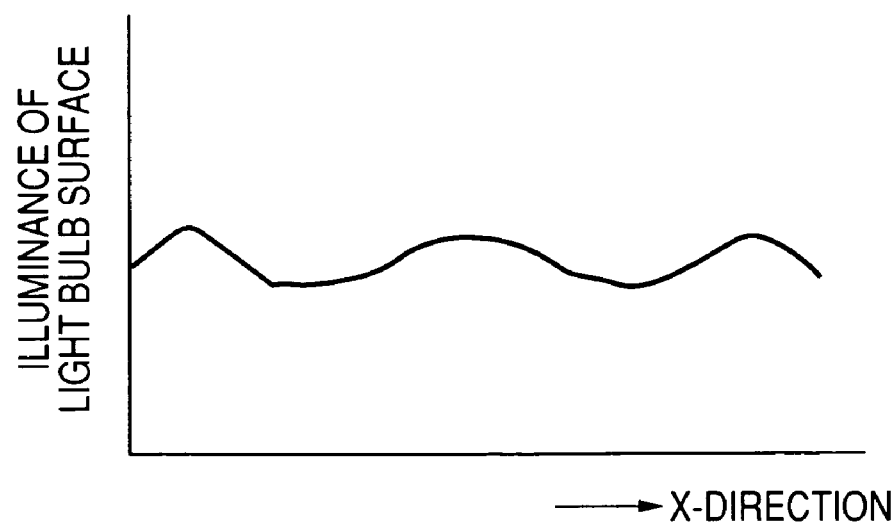
FIG. 12 is a schematic graph showing an illuminance distribution on the surface to be illuminated in the asymmetrical illumination optical system of the comparison example.

As described above, when the illumination optical system shown in FIGS. 9 and 10 is constructed using the integrator shown in FIG. 11 as each of the first integrator and the second integrator, a luminance distribution on the liquid crystal panel 507 becomes a luminance distribution as shown in FIG. 12. This is caused by the nonuniformity in the intensity distribution of the beam emitted from the light source system 100 and the influence of aberrations of the first beam compressing lens 302 and the second beam compressing lens 303. In general, the luminance distribution has three dull peaks as shown in FIG. 12.

Figure 13:
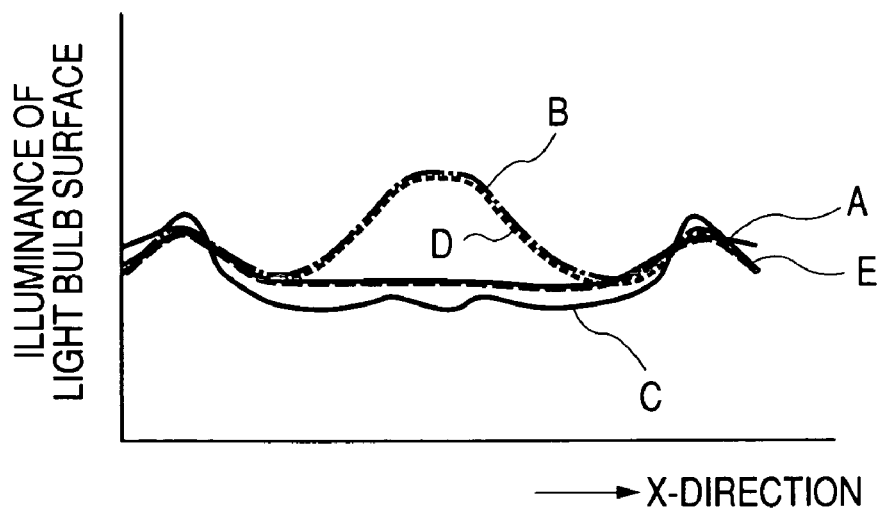
FIG. 13 is a schematic graph showing the illuminance distribution on the surface to be illuminated in the asymmetrical illumination optical system of the comparison example.

The optical integrator used for the asymmetrical illumination optical system (that is, an optical system in which each of the first integrator and the second integrator is composed of only cylindrical lenses) as shown in the comparison example is a cylindrical lens array CL in which the plurality of cylindrical lenses A', B', C', D', and E' are arranged as shown in FIG. 11. The intensity distribution on the surface to be illuminated is obtained as shown in FIG. 12. When the five constituent lenses A', B', C', D', and E' are provided from the top as shown in FIG. 11, a light amount distribution of beams passing thorough the respective lenses in the X-direction on the surface to be illuminated 400 becomes that shown in FIG. 13. As is apparent from FIG. 13, the light amount distribution of the beams passing through all the lenses has intensity peaks in vicinities of both ends thereof. Therefore, the peaks at both ends of the intensity distribution shown in FIG. 12 are formed by overlaps of the intensity peaks. In this time, a focal length of each of the lenses A', B', C', D', and E' in the XZ-section (that is, the section shown in FIG. 10) orthogonal to the arrange direction (Y-direction) of the plurality of lenses of the optical integrator is infinite.

In other words, with respect to all the lenses A', B', C', D', and E', the reciprocal of the focal length fx (1/fx) of each of the lenses in the section shown in FIG. 10, that is, in the XZ-section orthogonal to the arrange direction (Y-direction) of the plurality of lenses (and the optical axis La of the illumination optical system) is 0. When the reciprocals of the focal lengths (1/fx) of all the lenses A', B', C', D', and E' are substantially equal to one another, a light amount distribution is more likely to become the nonuniformed light amount distribution shown in FIG. 13.

In the light amount distribution of the beam passing through each of the lenses A', B', C', D', and E' on the surface to be illuminated 400, the two intensity peaks disposed in substantially symmetrical positions at both ends are caused mainly by aberration of the lens system in the section shown in FIG. 10. The positions of the peaks can be adjusted by setting $\Sigma(1/fx)$ values of the optical members disposed on each of the optical paths corresponding to the lenses A', B', C', D', and E' to values different from one another. In this embodiment, the $\Sigma(1/fx)$ values on the respective optical paths are optimally adjusted to shift the positions of the peaks at both ends of the light amount distribution of the beams traveling from the respective optical members A to E to the surface to be illuminated 400. Therefore, the entire light amount distribution on the surface to be illuminated 400 can be uniformed.

Figure 6:
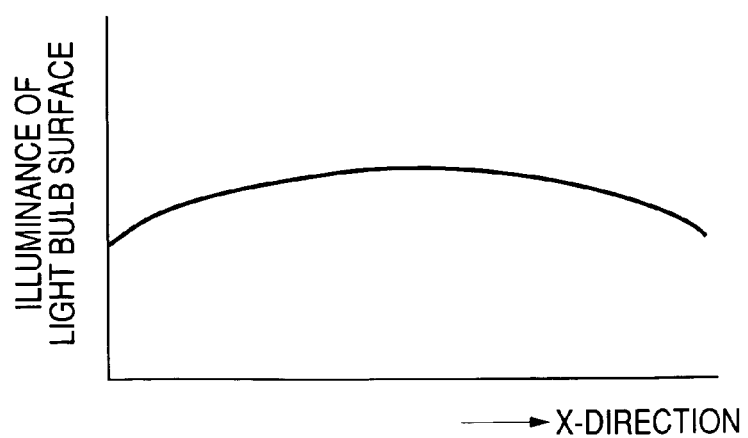
FIG. 6 is a schematic graph showing an illuminance distribution within an XZ-plane on a surface to be illuminated in the present invention.
Figure 7:
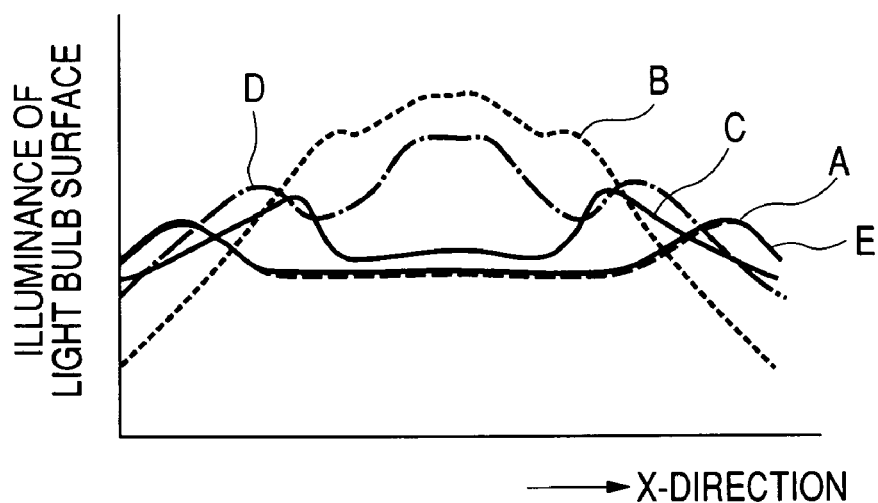
FIG. 7 is a schematic graph showing illuminance distributions of respective optical members of an integrator into which the illuminance distribution within the XZ-plane on the surface to be illuminated in the present invention as shown in FIG. 6 is divided.

FIGS. 6 and 7 are explanatory graphs showing a light amount distribution obtained by optimally adjusting the $\Sigma(1/fx)$ values in the case where fx is assumed to be a finite value with respect to each of the optical paths corresponding to the optical members B, C, and D. As is apparent from FIG. 7, the positions of the peaks at both ends are shifted according to the optical paths. As a result, the light amount distribution in which nonuniformity in illuminance is reduced as shown in FIG. 6 is obtained.

As described above, assuming that fx be a paraxial focal length of each of the optical members in the section (XZ-section) orthogonal to the arrange direction of the optical members of the integrator in this embodiment, the sum $\Sigma(1/fx)$ of the reciprocals of the focal lengths fx of the optical members disposed on at least one optical path of respective optical paths into which an optical path is divided by the first integrator 201 and which reach the surface to be illuminated 400 is adjusted. Therefore, the nonuniformity in an intensity distribution on the light bulb 400, which occurs in an asymmetrical illumination optical system, is reduced to obtain a more uniform distribution.

In FIG. 1, the optical members (lenses) which have refractive powers different from one another in the direction (X-direction) orthogonal to the arrange direction (Y-direction) of the optical members and are formed in a toric shape are used as the optical members B, C, and D among the five optical members of the second integrator 202 as shown in FIG. 3. However, the present invention is not limited to this. For example, all the five optical members of the second integrator 202 may be constructed so as to have refractive powers (including zero) different from one another in the direction orthogonal to the arrange direction. The optical members having refractive powers (which is not zero) different from one another in the direction (X-direction) orthogonal to the arrange direction (Y-direction) may be any optical members of the five optical members of the second integrator 202. For example, in FIG. 3, such optical members may be the optical members A, B, and C, the optical members A, B, and D, the optical members A, B, and E, the optical members A, C, and D, the optical members A, C, and E, the optical members A, D, and E, the optical members B, C, and D, the optical members B, C, and E, the optical members B, D, and E, the optical members C, D, and E, the optical members A and B, the optical members A and C, the optical members A and D, the optical members A and E, the optical members B and C, the optical members B and D, the optical members B and E, the optical members C and D, the optical members C and E, the optical members D and E, the optical member A, the optical member B, the optical member C, the optical member D, the optical member E, the optical members A, B, C, and D, the optical members A, B, C, and E, the optical members A, B, D, and E, the optical members A, C, D, and E, or the optical members B, C, D, and E. Here, it is desirable that at least one optical member of the plurality of optical members have a refractive power of substantially zero in the direction (X-direction) orthogonal to the arrange direction (Y-direction) of the optical members. The number of optical members is not limited to five, as long as the number of optical members is three or more.

The integrator constructed so as to include the optical members having refractive powers in the direction (X-direction) orthogonal to the arrange direction is not limited to the second integrator. Such an integrator may be the first integrator. Each of the first integrator and the second integrator may be constructed so as to include the optical members having refractive powers in the direction orthogonal to the arrange direction.

In Embodiment 1, the refractive powers of the optical members B, C, and D in the direction (X-direction) orthogonal to the arrange direction thereof are not necessarily different from one another and may be equal to one another. When at least two optical members of the all the optical members A, B, C, D, and E have refractive powers different from each other in the direction (X-direction) orthogonal to the arrange direction of the optical members, an effect in Embodiment 1 can be obtained. It is preferable that three optical members of the optical members A, B, C, D, and E have refractive powers different from one another in the direction (XZ-direction) orthogonal to the arrange direction of the optical members.

The first integrator may be provided with a refractive power within the XZ-plane with respect to a part of the optical paths respectively corresponding to the optical members A, B, C, D, and E and the second integrator may be provided with a refractive power within the XZ-plane with respect to another part of the optical paths.

In actuality, in view of chamfer being likely to occur during lens manufacturing, since steps in a boundary between adjacent lenses in toric shaped lenses is caused, the toric shaped lens is preferably applied to the second integrator which has no conjugate relationship with the surface to be illuminated (light bulb) 400.

Embodiment 2

Figure 4:
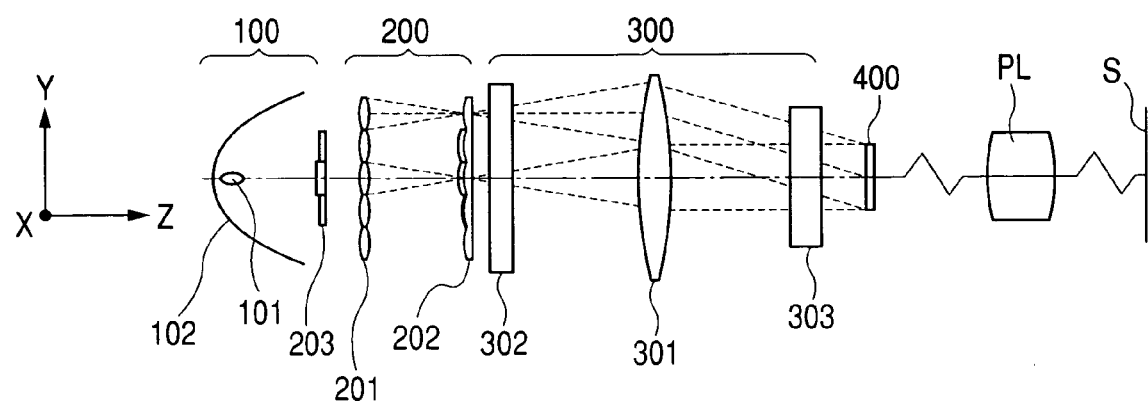
FIG. 4 is a principal part sectional view showing Embodiment 2 of the present invention.
Figure 5:
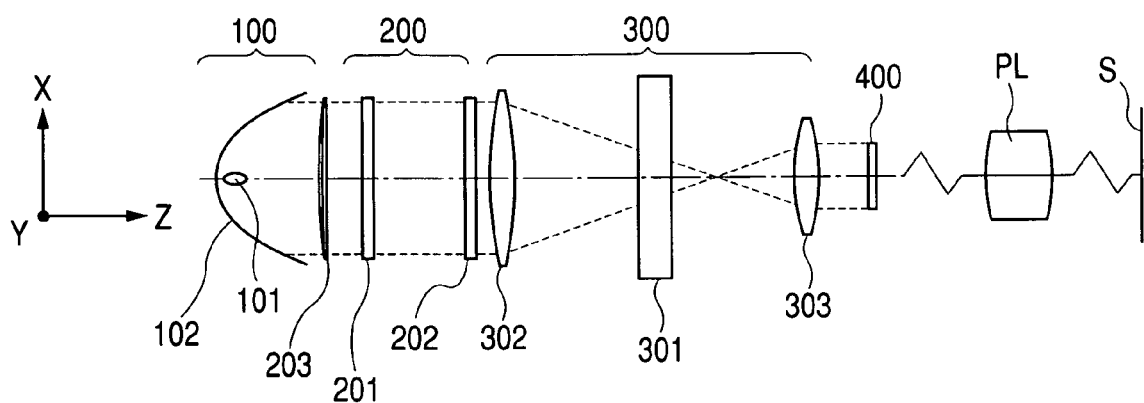
FIG. 5 is a principal part sectional view in a direction perpendicular to a paper surface shown in FIG. 4.

FIG. 4 is a principal part sectional view showing an image display apparatus including an illumination optical system according to Embodiment 2 of the present invention. FIG. 5 is a principal part sectional view in a direction perpendicular to a paper surface shown in FIG. 4, including the optical axis La of the illumination optical system as shown in FIG. 1.

This embodiment is different from Embodiment 1 shown in FIG. 1 in that the second integrator 202 is composed of a plurality of cylindrical lenses as in the first integrator 201, and that a distribution correcting lens 203 is provided as illuminance nonuniformity reducing means for reducing nonuniformity in illuminance on the surface to be illuminated 400 between the light source system 100 and the optical integrator 200. Other structures are identical to those in Embodiment 1.

The distribution correcting lens 203 has a structure in which a plurality of (three) cylindrical lenses, each of which has no refractive power within the YZ-plane shown in FIG. 4 and has a refractive power only within the XZ-plane shown in FIG. 5, are arranged in the X-direction.

In this embodiment, the second optical integrator includes five optical members as in Embodiment 1. Assume that the respective optical members of the second integrator 202 are given by A, B, C, D, and E in order from the top. The three cylindrical lenses of the distribution correcting lens 203 are disposed so as to have refractive powers on the optical paths passing through the three optical members B, C, and D in the sectional direction (Y-direction) orthogonal to the arrange direction (Y-direction) The respective cylindrical lenses composing the distribution correcting lens 203 are provided with refractive powers which are different from one another and optimal so that the lens obtains an intensity distribution having a gentle slope on the light bulb 400.

In this embodiment, the distribution correcting lens 203 is disposed on the optical paths corresponding to the optical members B, C, and D of the optical members A, B, C, D, and E. The distribution correcting lens may be a correction lens which is disposed on only one optical path of the optical paths respectively corresponding to the optical members A, B, C, D, and E and has a refractive power within the XZ-plane. Of course, the distribution correcting lens 203 may be disposed on two optical paths of the optical paths corresponding to the optical members A, B, C, D, and E, three optical paths thereof, four optical paths thereof, or five (all) optical paths thereof. When the distribution correcting lens is disposed across at least two optical paths, it is desirable to dispose a distribution correcting lens having refractive powers different from one another at least within the XZ-plane. When the distribution correcting lens is disposed across all the optical paths corresponding to the optical members A, B, C, D, and E, it is required that a lens disposed on one of the optical paths have refractive power within the XZ-plane different from that of a lens disposed on another optical path. The distribution correcting lens described here is preferably constructed to substantially have a refractive power only within the XZ-plane. The position of the distribution correcting lens 203 to be disposed is not limited to a position between the light source system and the first integrator. The distribution correcting lens 203 may be disposed between the first integrator and the second integrator. Alternatively, the distribution correcting lens may be disposed between the second integrator and the surface to be illuminated (preferably, just at the rear of the second integrator, that is, on the side closer to the surface to be illuminated than the second integrator in a state in which any optical element is not disposed between the second integrator and the distribution correcting lens).

A first distribution correcting lens disposed on an optical paths corresponding to the optical members A, B, C, D, and E and a second distribution correcting lens disposed on another optical paths may be disposed at positions optically different from each other. For example, the first distribution correcting lens and the second distribution correcting lens may be disposed at two different positions among (i) a position between the light source system and the first integrator, (ii) a position between the first integrator and the second integrator, and (iii) a position between the second integrator and the surface to be illuminated (preferably a position disposed just at the rear of the second integrator, that is, a position disposed on the side closer to the surface to be illuminated than the second integrator in a state in which any optical element is not disposed between the second integrator and the corresponding (first or second) distribution correcting lens). In this case, the refractive power of the first distribution correcting lens may be equal to the refractive power of the second distribution correcting lens. It is preferable that the first distribution correcting lens and the second distribution correcting lens have refractive powers different from each other. First to third distribution correcting lenses may be disposed at (i), (ii), and (iii) as described above, respectively. Even in this case, refractive powers of the first to third distribution correcting lenses may be equal to one another. It is preferable that the first to third distribution correcting lenses have refractive powers different from one another.

In this embodiment, the second integrator 202 may be constructed as in Embodiment 1. According to such a structure, the intensity distribution on the surface to be illuminated 400 within the XZ-plane can be easily further uniformed. Conversely, in this embodiment, each of the first integrator and the second integrator may be a normal cylindrical lens array, that is, the cylindrical lens array in which the plurality of cylindrical lenses substantially having refractive powers only in the arrange direction of the cylindrical lenses are arranged as shown in FIG. 11.

Embodiment 3

Figure 14:
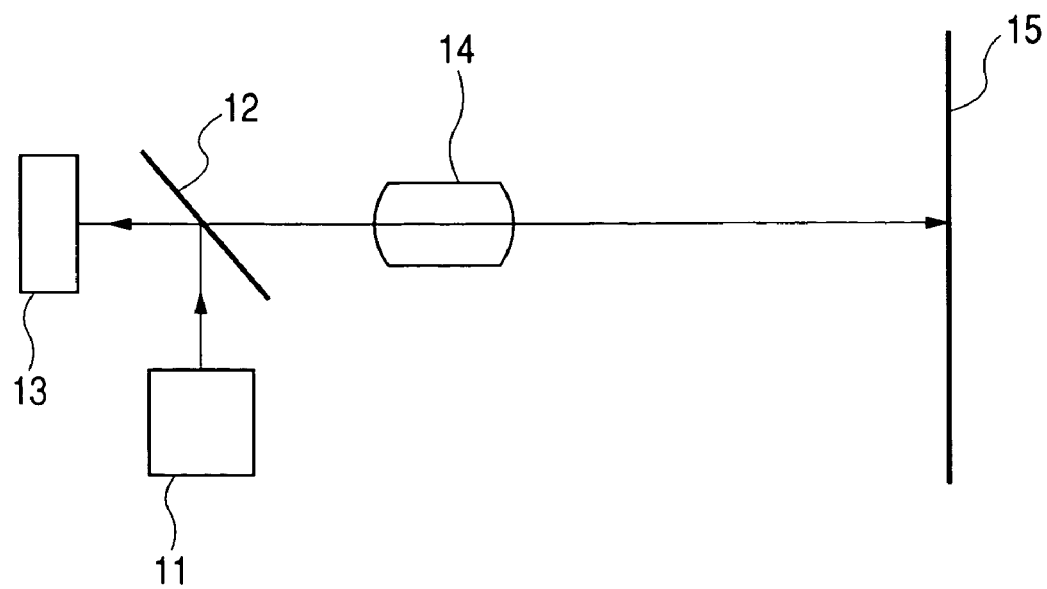
FIG. 14 is a principal part schematic view showing an image display apparatus according to Embodiment 3 of the present invention.

FIG. 14 is a principal part schematic view showing a reflection type liquid crystal projector serving as an image display apparatus according to Embodiment 3 of the present invention. In this embodiment, the illumination optical system described in Embodiment 1 or 2 is used as an illumination optical system. A reflection type liquid crystal display panel is used as an image display element.

In FIG. 14, a beam emitted from illumination means 11 is reflected on a beam splitter 12 and then incident on a reflection type liquid crystal display panel 13 and reflected thereon. Then, the beam is optically modulated by the liquid crystal display panel 13, passes through the beam splitter 12, and is incident on a projection lens 14. The beam corresponding to image information based on the liquid crystal display panel 13 is projected onto a screen 15 by the projection lens (zoom lens) 14.

Embodiment 4

Figure 15:
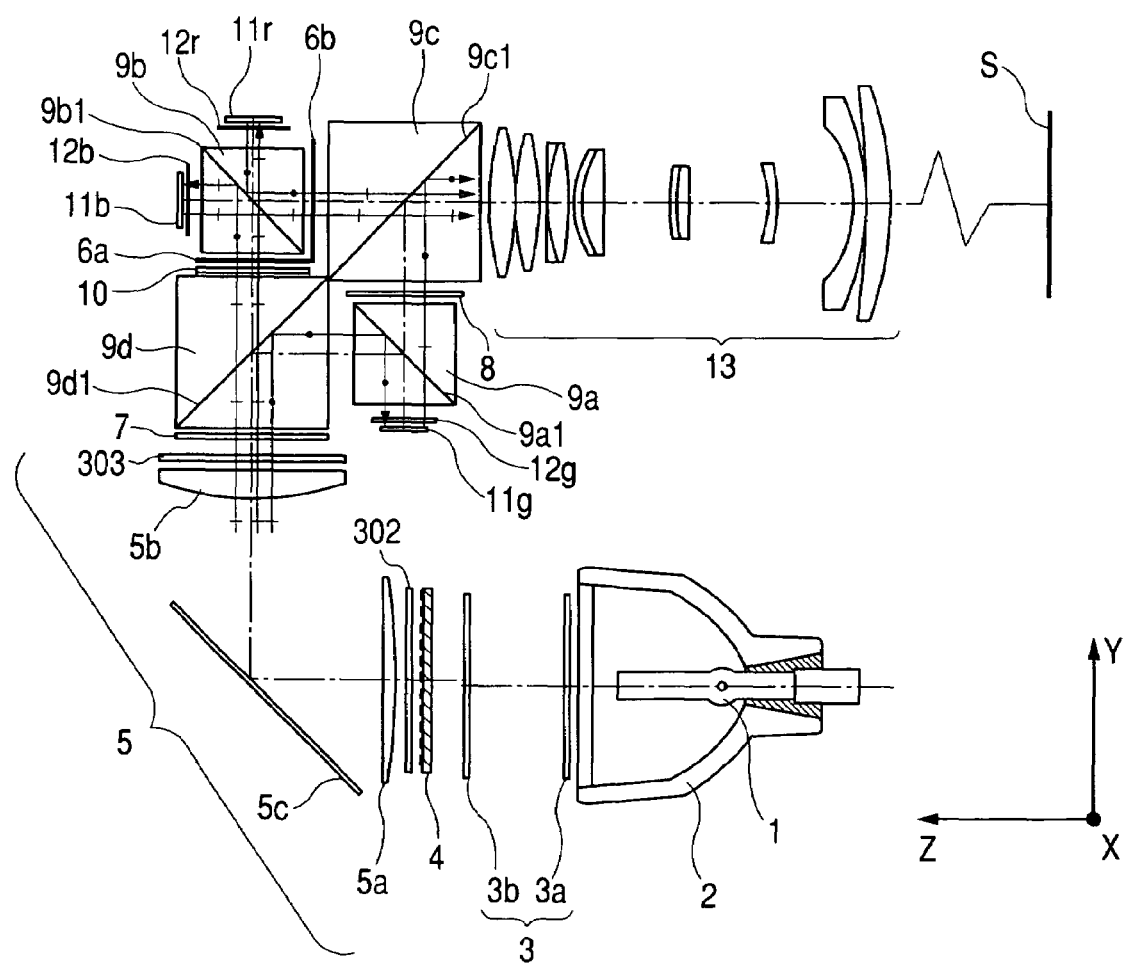
FIG. 15 is a principal part schematic view showing an image display apparatus according to Embodiment 4 of the present invention.

FIG. 15 is a principal part schematic view showing a color liquid crystal projector using an illumination optical system according to Embodiment 4 of the present invention. In FIG. 15, a light source (light source means) 1 emits white light having a continuous spectrum. A reflector 2 condenses beam from the light source 1 in a predetermined direction. An optical integrator 3 includes a first integrator (first beam splitting means) 3a and a second integrator (second beam splitting means) 3b and splits the beam from the light source 1 into a plurality of beams.

It is preferable that a direction in which optical members composing the first integrator 3a have refractive powers (direction in which a plurality of optical members are arranged) be substantially perpendicular to a post-color splitting plane (plane formed by a principal ray of an incident beam and principal rays of a plurality of exiting beams at color splitting using color splitting members) in an optical sense (in the case where an optical path is developed). Conversely, it is desirable that a longitudinal direction of each of optical members be substantially included in the color splitting plane or substantially parallel to the color splitting plane in an optical sense. Of course, when an optical path is bent by a mirror or the like, an optical direction may change. The color splitting plane is substantially parallel (identical) to a paper surface, so that a direction in which the first integrator 3a has a refractive power is a paper surface direction. In other words, it can be also said that the direction in which the optical members composing the first integrator 3a have refractive powers (direction in which the plurality of optical members are arranged) is substantially parallel to the post-color splitting plane (polarizing separation plane or dichroic plane) in an optical sense.

A polarizing conversion element 4 converts incident unpolarized beam into predetermined polarized beam as exiting beam. An optical system 5 includes a condenser lens 5a, a field lens 5b, and first and second beam compressing lenses 302 and 303. Reference numeral 5c denotes a reflection mirror.

A first color selective phase difference plate 6a converts a polarizing direction of B-beam (blue beam) by 90 degrees and does not convert a polarizing direction of R-beam (red beam). A second color selective phase difference plate 6b converts the polarizing direction of the R-beam by 90 degrees and does not convert the polarizing direction of B-beam. A third color selective phase difference plate 7 converts a polarizing direction of G-beam (green beam) by 90 degrees and does not convert the polarizing directions of the B-beam and R-beam. Reference numeral 8 denotes a ½-wave plate. A first polarizing beam splitter 9a, a second polarizing beam splitter 9b, a third polarizing beam splitter 9c, and a fourth polarizing beam splitter 9d each have a polarizing separation plane for transmitting P-polarized beam and reflecting S-polarized beam. The fourth polarizing beam splitter 9d may be a dichroic prism or a dichroic mirror. Of course, the third polarizing beam splitter 9c may be also a dichroic prism or a dichroic mirror.

A color filter 10 cuts beam having a wavelength between the G-beam and the R-beam. Image display elements 11r, 11g, and 11b that reflect beam and modulate images for displaying are a reflection type liquid crystal display element for red, a reflection type liquid crystal display element for green, and a reflection type liquid crystal display element for blue, respectively. Reference numerals 12r, 12g, and 12b denote a ¼-wave plate for red, a ¼-wave plate for green, and a ¼-wave plate for blue, respectively. A projection lens 13 is a lens system having a single focal length or a zoom lens.

Next, optical operation will be described. Beam emitted from the light source 1 is reflected on the reflector 2 in a predetermined direction and condensed thereby. Here, the reflection surface of the reflector 2 is formed in a parabolic shape. Therefore, beam from a light emitting point of the light source 1 which is provided at a focal position of the parabolic surface is reflected on the parabolic shaped reflection surface and then becomes a beam parallel to the symmetrical axis of the parabolic surface. The light emitting point of the light source 1 is not an ideal point light source but a light source having a finite size, so that the condensed beam includes many beam components which are not parallel to the symmetrical axis of the parabolic surface. The condensed beam from the reflector 2 is incident on the first integrator 3a.

Figure 16:
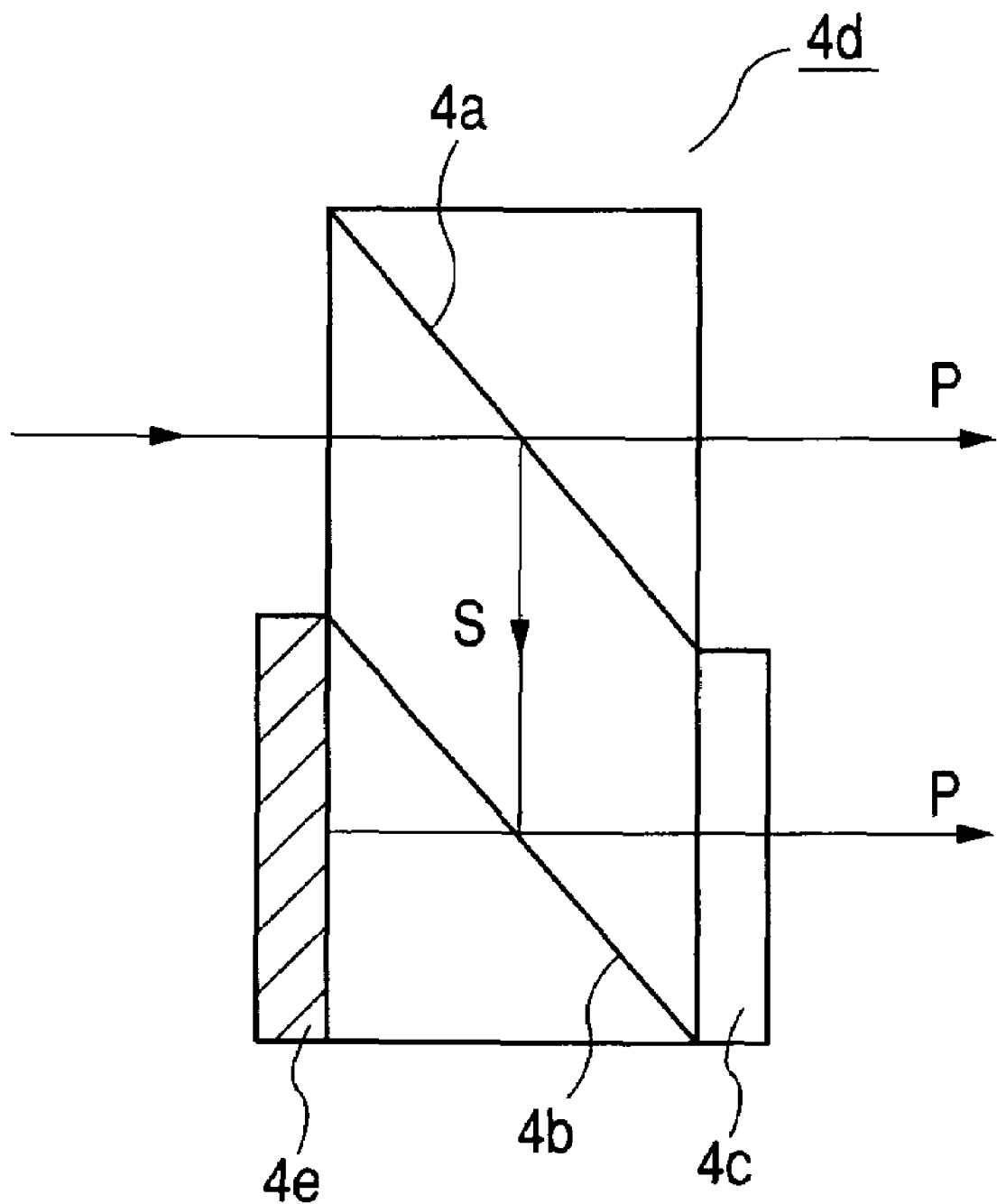
FIG. 16 is an explanatory view showing a polarizing conversion element in the present invention.

The incident on the first integrator 3a is split into a plurality of beams and condensed. Then, the beams pass through the second integrator 3b to form a plurality of light source images (first beam emitting point images) in the vicinity of the polarizing conversion element 4. As shown in FIG. 16, the polarizing conversion element 4 has a structure in which a plurality of polarizing conversion portions 4d, each of which is composed of a polarizing separation plane 4a, a reflection surface 4b, and a ½-wave plate 4c, are arranged in a line. FIG. 16 shows the single polarizing conversion portion 4d. Each of the plurality of beams condensed in a line is incident on the corresponding polarizing separation plane 4a and divided into transmitted beam having a P-polarized light component and reflected beam having an S-polarized light component. The reflected beam having the S-polarized light component is reflected on the reflection surface 4b and travels in the same direction as that of the transmitted beam having the P-polarized light component. Then, the polarized light component of the beam is converted into the same polarized light component as the P-polarized light component through the ½-wave plate 4c. Therefore, the light is exited as beam whose polarizing direction (|) coincides with that of the transmitted light. Reference numeral 4e denotes a light shielding portion.

The plurality of beams, which are subjected to polarizing conversion, are condensed in the vicinity of the polarizing conversion element 4. Then, the condensed beams reach the optical system 5 for condensing as divergent beams. The plurality of beams from the polarizing conversion element 4 form three illumination areas, each of which has a rectangular uniform illuminance distribution, through the optical system 5.

The reflection type liquid crystal display elements 11r, 11g, and 11b are disposed on the three illumination areas, respectively.

The third color selective phase difference plate 7 provided on an illumination optical path does not convert the B-beam and the R-beam to maintain the P-polarized beam (|). The G-beam having a wavelength in a range of about 500 nm to 575 nm is converted into the S-polarized beam (•). Here, the polarizing directions (•) and (|) indicates polarizing directions of the polarizing conversion element and polarizing beam splitters with respect to the polarizing separation plane.

The B-beam, the G-beam, and the R-beam whose polarizing directions are adjusted by the third color selective phase difference plate 7 are incident on the fourth polarizing beam splitter 9d. The G-beam, which is S-polarized, is reflected on a polarizing separation plane 9d1 and the R-beam and the B-beam, each of which is P-polarized, transmit through the polarizing separation plane 9d1, to thereby perform color splitting.

The G-beam subjected to color split by the polarizing separation plane 9d1 is incident on the first polarizing beam splitter 9a as the S-polarized beam (•) and reflected on a polarizing separation plane 9a1. Then, the G-beam passes through the ¼-wave plate 12g and reaches the reflection type liquid crystal display element for G (green) 11g. The G-beam is image-modulated by the reflection type liquid crystal display element for G 11g and reflected thereon. The S-polarized beam component (•) of the image-modulated and reflected G-beam is reflected on the polarizing separation plane 9a1 again to become return beam. Therefore, the S-polarized beam component is returned to the light source 1 side and removed from projection beam.

The P-polarized beam component (|) of the image-modulated and reflected G-beam transmits through the polarizing separation plane 9a1 to become the projection beam.

The beam (|), which is image-modulated by the liquid crystal display element 11g and transmits through the first polarizing beam splitter 9a, transmits through the first ½-wave plate 8, which is disposed so as to align a slow axis with a direction of 45 degrees relative to the polarizing direction. Then, the beam is incident on the third polarizing beam splitter 9c as the S-polarized light (•), reflected on the polarizing separation plane 9c1, and reaches a projection lens 13.

The R-beam and the B-beam (|) that transmit through the fourth polarizing beam splitter 9d are incident on the color filter 10. The color filter 10 is a dichroic filter that reflects yellow beam corresponding to an intermediate wavelength region (wavelength range of about 500 nm to 575 nm) between the G-beam and the R-beam. Therefore, an unnecessary yellow color component caused in a transition region of a characteristic of the third color selective phase difference plate 7 is removed by the color filter 10.

The color filter 10 may absorb yellow beam.

Transmission beam subjected to color adjustment by the color filter 10 is incident on the first color selective phase difference plate 6a. The first color selective phase difference plate 6a converts the B-beam into the S-polarized light (•) while the R-beam (beam having a wavelength of 550 nm or more) is maintained to be the P-polarized beam (•) Here, a transition region in which a polarizing state changes is set to a region (500 nm to 575 nm in wavelength) of the G-beam which is not included as color beam.

Therefore, the R-beam is incident on the second polarizing beam splitter 9b as the P-polarized beam (|) and the B-beam is incident thereon as the S-polarized beam (•). Then, in the second polarizing beam splitter 9b, the R-beam transmits through a polarizing separation plane 9b1 and reaches the reflection type liquid crystal display elements for R 11r and the B-beam is reflected on the polarizing separation plane 9b1 and reaches the reflection type liquid crystal display elements for B 11b.

The R-beam is image-modulated by the reflection type liquid crystal display element for R 11r and reflected thereon. The P-polarized beam component (|) of the R-beam image-modulated by and reflected on the liquid crystal display element 11r transmits through the polarizing separation plane 9b1 again to become return beam. Therefore, the P-polarized beam component is returned to the light source 1 side and removed from projection beam.

The S-polarized beam component (•) of the R-beam image-modulated by the liquid crystal display element 11r is reflected on the polarizing separation plane 9b1 to become the projection beam.

Similarly, the B-beam is image-modulated by the reflection type liquid crystal display element for B 11b and reflected thereon. The S-polarized beam component (•) of the B-beam image-modulated by the liquid crystal display element 11b is reflected on the polarizing separation plane 9b1 again to become return beam. Therefore, the S-polarized beam component is returned to the light source 1 side and removed from projection beam.

The P-polarized beam component (|) of the B-beam image-modulated by the liquid crystal display element 11b transmits through the polarizing separation plane 9b1 to become the projection beam.

As a result, the projection beam of the B-beam and the projection beam of the R-beam are combined into a beam.

The beam, into which the projection beam of the B-beam and the projection beam of the R-beam are combined, is incident on the second color selective phase difference plate 6b. The second color selective phase difference plate 6b rotates only the polarizing direction of the R-beam (beam having a wavelength of about 530 nm or more) by 90 degrees. Therefore, each of the R-beam and the B-beam is incident on the third polarizing beam splitter 9c as the P-polarized beam (|). Then, the R-beam and the B-beam transmit through the polarizing separation plane 9c1 and are combined with the projection beam of the G-beam.

The combined projection beam of the R-, G-, and B-beam based on respective image information is projected onto the screen S or the like by the projection lens 13, so that image information is formed on the screen S.

Embodiment 5

Figure 17A:
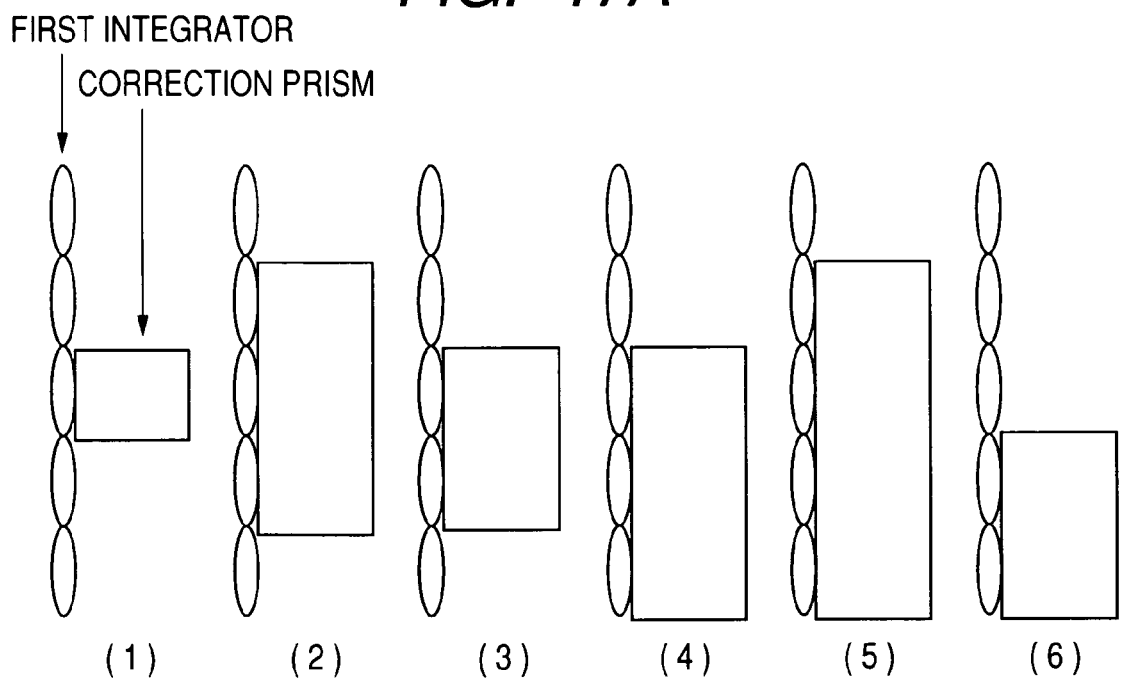
FIG. 17A is a structural view showing an integrator of an image display apparatus according to Embodiment 5 of the present invention (sectional view on an XY-plane)
Figure 17B:
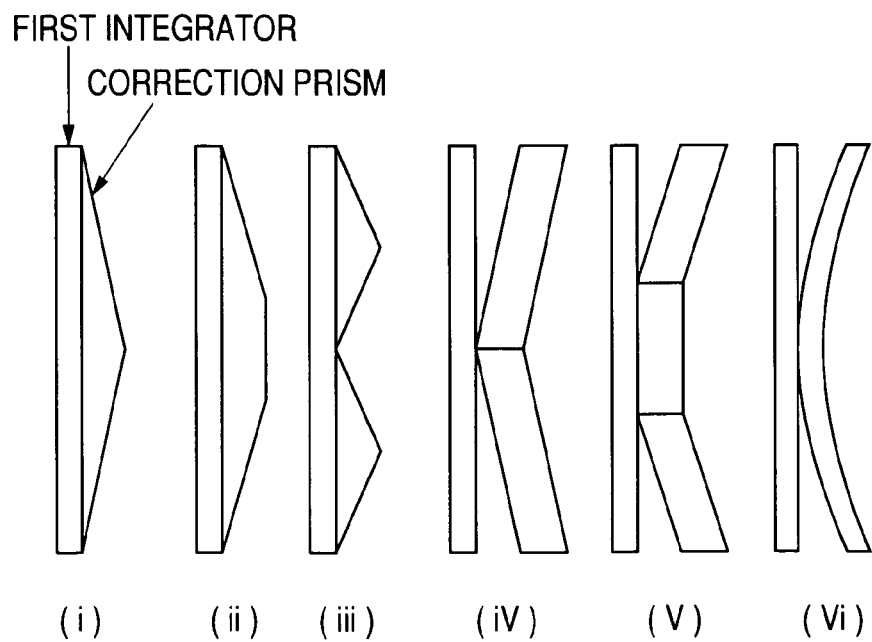
FIG. 17B is a structural view showing the integrator of the image display apparatus according to Embodiment 5 of the present invention (sectional view on an XZ-plane)
Figure 18:
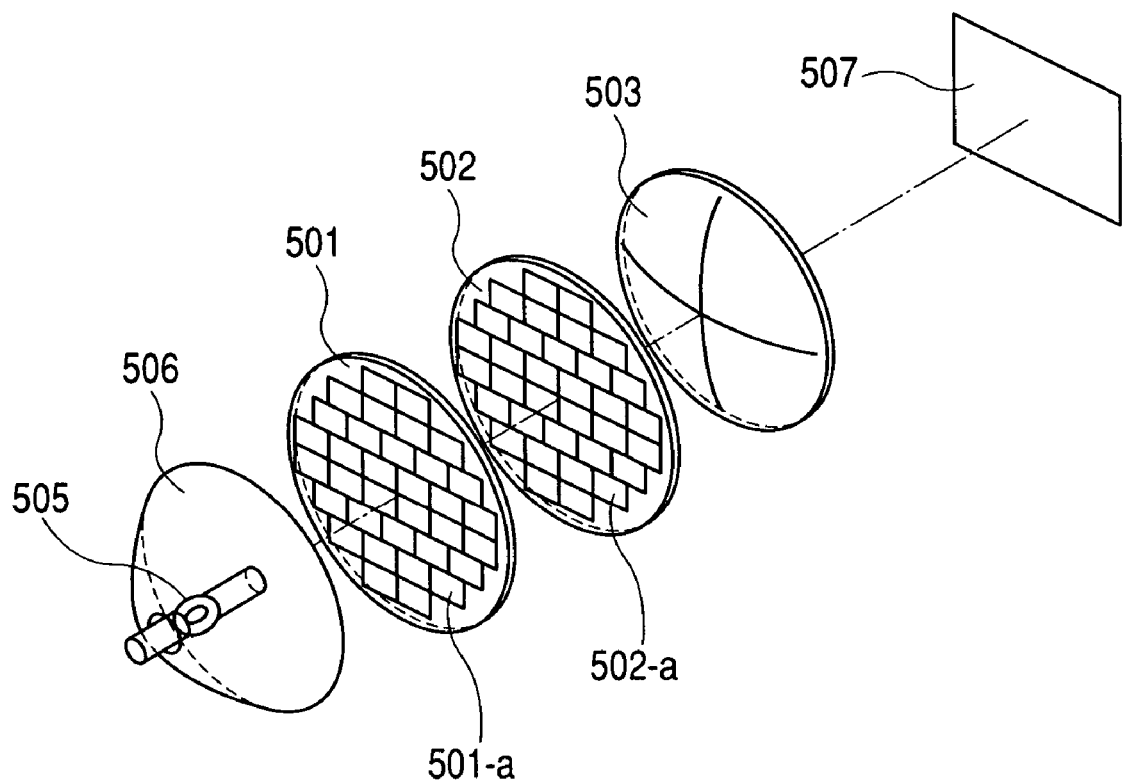
FIG. 18 is an explanatory view showing a conventional example.

In Embodiment 5, a fundamental optical system is identical to that in other embodiment shown in FIG. 1, 2, or the like and can be applied to the same image display apparatus as that shown in FIG. 15. The object of this embodiment is to reduce the nonuniformity in illuminance on the surface to be illuminated (image forming element), by composing each of the first integrator and the second integrator, which are described in Embodiments 1 to 4, of the normal cylindrical lens array as shown in FIG. 11, and by providing an optical deflection element, that is, a prism or a prism assembly (hereinafter referred to as a correction prism) as a constituent element near the cylindrical lens array. FIGS. 17A and 17B show examples of the correction prism described here. In this example, a correction prism, in which any one of XZ-sectional views (i) to (vi) shown in FIG. 17B is applied to any one of YZ-sectional views (1) to (6) shown in FIG. 17A, is employed for an illumination optical system and an image display apparatus.

FIGS. 17A and 17B show respective cases, in each of which a correction prism is disposed just at the rear of the first integrator. FIGS. 17A and 17B show respective states, in each of which a cylindrical lens array includes five cylindrical lenses and a correction prism is disposed just at the rear of the cylindrical lens array. Here, as described in the sectional views on the YZ-plane, the correction prism is disposed just at the rear of cylindrical lenses except at least one cylindrical lens. In other words, if the correction lenses are disposed just at the rears of all the cylindrical lenses included in the cylindrical lens array, an illuminance nonuniformity correction effect disappears or weakens. Therefore, the correction prism is only disposed just at the rear of a part of the cylindrical lenses. The correction prism may be disposed at the rear of the second integrator.

The sectional views on the XZ-plane in FIG. 17B are examples of the sectional views of the prism on the XZ-plane. The prism may be a prism which is flat on the light source side and has a convex shape on the surface-to-be-illuminated side, a prism which is flat on the light source side and has two convex portions on the surface-to-be-illuminated side, or a prism which has a convex shape on the light source side and a concave shape on the surface-to-be-illuminated side. Of course, the correction prism may be composed of a plurality of prisms. Note that the correction prism is desirably composed so as to have no refractive power (no focal length) because of the correction prism. The correction prism is not limited to the above-mentioned structures. The correction prism includes all prisms or prism members for deflecting beams to reduce the nonuniformity in illuminance on the surface to be illuminated.

In FIGS. 17A and 17B related to this embodiment, the same kind (one kind of (i) to (iv)) of prisms are disposed on a plurality of optical paths of the optical paths corresponding to the optical members A, B, C, D, and E. However, it is desirable to locate a plurality of different prisms on a plurality of optical paths of the optical paths corresponding to the optical members A, B, C, D, and E, which are different from each other. For example, the prism (i) may be disposed on the optical path corresponding to the optical member B and the prism (ii) may be disposed on the optical path corresponding to the optical member C. Further, the prism (iii) may be disposed on the optical path corresponding to the optical member D. Prisms having the same shape may be disposed such that their optical positions are different from each other.

It is also possible to locate a prism on each of the optical paths corresponding to the optical members A, B, C, D, and E. In this case, it is required that a prism disposed on a part of the optical paths corresponding to the optical members A, B, C, D, and E have a shape (thickness or angle) different from that of a prism disposed on another part of the optical paths. Alternatively, it is required that optical positions be different from each other. An arbitrary combination of the above-mentioned embodiments may be used within a noncontradictory range.

In those embodiments, the illumination optical system (image display apparatus) includes the two lens arrays (cylindrical lens arrays each having the toric surface), in each of which the plurality of minute optical elements are arranged in the predetermined direction (Y-direction in the embodiment shown in FIG. 1). A single lens array having such a structure or three or more lens arrays each having such a structure may be used. Even in this case, it is desirable to dispose the lens array(s) between the light source and the beam compressing lens (lens disposed on the light source side, of the first and second beam compressing lenses). The illumination optical system may be configured to have a lens array in which a plurality of minute optical elements are arranged in not only the Y-direction but also the X-direction. It is desirable to use two lens arrays, in each of which the plurality of minute optical elements are arranged in the Y-direction and the X-direction. A single lens array having such a structure or three or more lens arrays each having such a structure may be used.

This application claims priority from Japanese Patent Application No. 2003-411784 filed Dec. 10, 2003, which is hereby incorporated by reference herein.

What is claimed is:

1. A lens array having a plurality of first minute optical elements which are one-dimensionally arranged in a predetermined arrange direction, wherein two of the plurality of first minute optical elements have refractive powers different from each other in a direction perpendicular to the predetermined arrange direction,
   wherein the plurality of first minute optical elements are arranged only in the predetermined arrange direction,
   wherein the two of the plurality of first minute optical elements have the same refractive powers in the predetermined arrange direction,
   wherein refractive powers of all the plurality of first minute optical elements in the predetermined arrange direction are substantially equal to one another, and
   wherein a refractive power of at least one of the plurality of the first minute optical elements in a direction perpendicular to the predetermined arrange direction is substantially zero.

2. A lens array according to claim 1, wherein the direction perpendicular to the predetermined arrange direction is substantially perpendicular to both the predetermined arrange direction and a principal ray of a beam passing through the lens array.

3. An illumination optical system for illuminating a surface to be illuminated with a beam from a light source, comprising:
   the lens array according to claim 1.

4. An illumination optical system for illuminating a surface to be illuminated with a beam from a light source, comprising:
   first beam splitting means for splitting the beam from the light source into a plurality of beams, the first beam splitting means including a plurality of first minute optical elements which are one-dimensionally arranged in a predetermined arrange direction; and
   second beam splitting means including a plurality of second minute optical elements which are one-dimensionally arranged in the predetermined arrange direction so as to correspond to the plurality of beams,
   wherein two of the plurality of first minute optical elements have refractive powers different from each other in a direction perpendicular to the predetermined arrange direction and/or two of the plurality of second minute optical elements have refractive powers different from each other in the direction perpendicular to the predetermined arrange direction,
   wherein the plurality of first minute optical elements are arranged only in the predetermined arrange direction,
   wherein the two of the plurality of first minute optical element have the same refractive powers in the predetermined arrange direction, and
   wherein refractive powers of all the plurality of first minute optical elements in the predetermined arrange direction are substantially equal to one another.

5. An image display apparatus, comprising:
   the illumination optical system according to claim 3;
   at least one image display element illuminated with the beam from the light source by the illumination optical system; and
   a projection optical system for projecting beam from the at least one image display element onto a surface to be projected.

6. An image display apparatus, comprising:
   the illumination optical system according to claim 4;
   at least one image display element illuminated with the beam from the light source by the illumination optical system; and
   a projection optical system for projecting the beam from the at least one image display element onto a surface to be projected.

7. A lens array according to claim 1, wherein the plurality of first minute optical elements are arranged in a uniform manner.

8. A lens array according to claim 1, wherein the plurality of first minute optical elements are arranged along a single plane.

9. An illumination optical system according to claim 4, wherein the plurality of first minute optical elements are arranged in a uniform manner.

10. An illumination optical system according to claim 4, wherein the plurality of first minute optical elements are arranged along a single plane.

* * * * *